United States Patent [19]
Kaiser et al.

[11] Patent Number: 5,315,296
[45] Date of Patent: May 24, 1994

[54] CUEING LIGHT CONFIGURATION FOR AIRCRAFT NAVIGATION

[75] Inventors: Mary K. Kaiser, Los Altos; Walter J. Johnson, San Jose, both of Calif.

[73] Assignee: The United States of America as represented by the Administrator of the National Aeronautics and Space Administration, Washington, D.C.

[21] Appl. No.: 935,939

[22] Filed: Aug. 27, 1992

[51] Int. Cl.⁵ .............................................. G08B 21/00
[52] U.S. Cl. ................................. 340/946; 73/178 H; 340/953; 340/961; 340/981; 362/62
[58] Field of Search ............... 340/946, 947, 953, 954, 340/955, 981, 982, 961; 356/1, 2, 376; 362/62; 244/1 R, 17.11; 73/178 H

[56] References Cited

U.S. PATENT DOCUMENTS

| | | |
|---|---|---|
| 2,017,692 | 10/1935 | Gaty . |
| 2,064,722 | 12/1936 | Bartow . |
| 2,532,104 | 11/1950 | King . |
| 4,115,841 | 9/1978 | Alexander ............................. 362/62 |
| 4,385,354 | 5/1983 | Hornfeld et al. .................... 340/953 |
| 4,916,445 | 4/1990 | Crossley ............................... 340/961 |
| 5,043,726 | 8/1991 | Shifrin ................................. 340/953 |

FOREIGN PATENT DOCUMENTS

8604437 7/1986 World Int. Prop. O. .......... 340/953

OTHER PUBLICATIONS

"Visual Augmentation for Night Flight Over Featureless Terrain" by Kaiser et al (Am. Helicopter Soc. 48th Ann. Forum) Jun. 3–5, 1992.
"Night Flight Over Limited-Feature Terrains: . . . ", Mowafy et al. (Human Factors Seminar) Sep. 2–6, 1991.

*Primary Examiner*—Brent Swarthout
*Attorney, Agent, or Firm*—Darrell G. Brekke; Guy Miller; John R. Manning

[57] ABSTRACT

A pattern of light is projected from multiple sources located on an aircraft to form two clusters. The pattern of each cluster changes as the aircraft flies above and below a predetermined nominal altitude. The initial patterns are two horizontal, spaced apart lines. Each is capable of changing to a delta formation as either the altitude or the terrain varies. The direction of the delta cues the pilot as to the direction of corrective action.

8 Claims, 4 Drawing Sheets

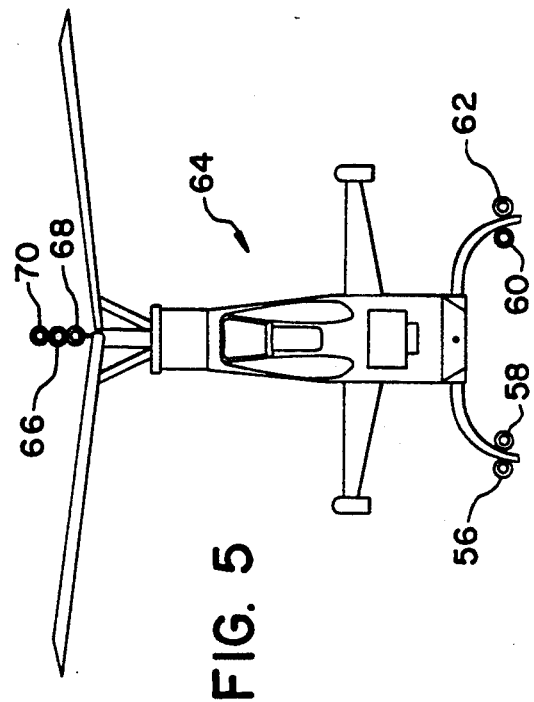
FIG. 3
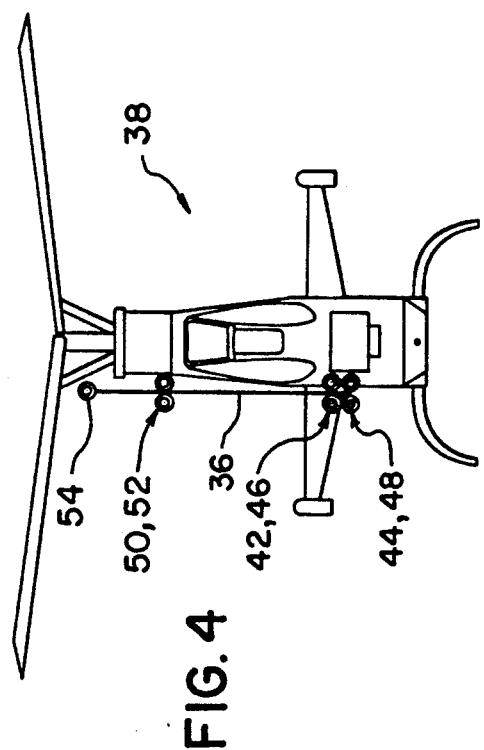
FIG. 5
FIG. 4

FIG. 6
FIG. 7
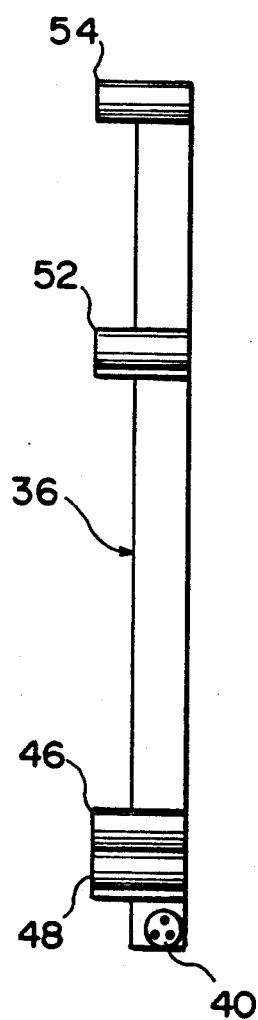
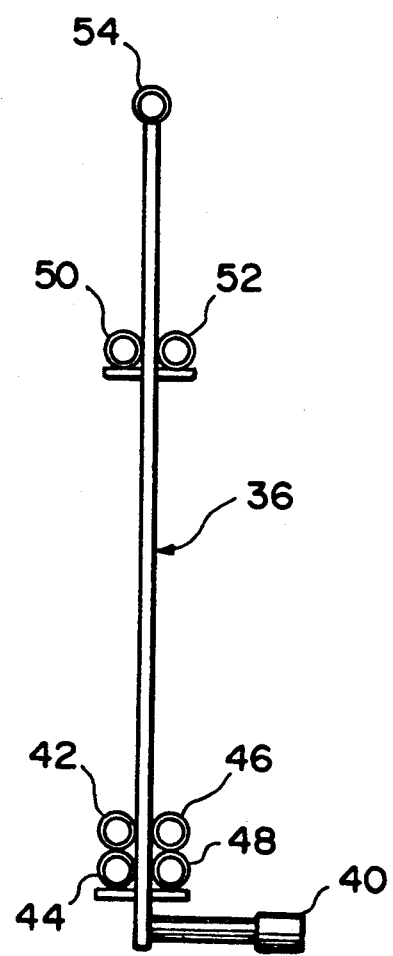

CUEING LIGHT CONFIGURATION FOR AIRCRAFT NAVIGATION

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The present invention relates generally to the field of aircraft navigational aides and, more specifically, to a cueing light configuration capable of assisting pilots flying low, at night or in low light and over generally featureless terrain.

TECHNICAL FIELD OF THE INVENTION

Cueing lights have been used in the past to aid pilots in navigation under certain conditions. One example is the "visual approach slope indicator" (VASI) used to keep an incoming pilot on the right glidepath as he or she nears the runway. Basically, two sets of lights are fitted with reflectors and slats so that they send out red light over a very narrow angle and white light over an equally narrow, but higher, angle. The lights are located on both sides of the runway. As the aircraft approaches, the pilot keeps the lights carefully aligned. If the pilot is at the proper approach angle, he will see one red and one white light on each side of the runway. If the pilot is approaching too high, he will see two sets of white lights, while if the approach is too low, the pilot will see two sets of red lights.

While the aforementioned system has certain advantages, it is limited in use to air traffic control in and around airports, given that the lights are ground-based, and is only suitable for a particular flight operation, i.e., the landing approach.

In certain civilian and military flight operations, the pilot is required to fly low in reduced visibility conditions, over somewhat featureless terrain. The development and continuing refinement of night vision devices, such as infrared night vision goggles, has made it possible to conduct relatively safe low-altitude helicopter f lights under reduced-visibility conditions. However, these devices are not sufficient in environments offering relatively featureless terrains, such as the desert or over large bodies of water. Under these conditions, the pilot may not be able to discern the true horizon, may perceive a false horizon in a serendipitous contrast variation, and/or may not be able to recover the structure, slope and orientation of the terrain from the available information. As a result of any one or combination of the above, the pilot may err in judging the aircraft's altitude and speed, with serious consequences.

Lighting systems have been used on aircraft to aid pilots in navigation. U.S. Pat. No. 2,064,722 to Bartow describes an aircraft lighting system for projecting distinctive patterns on the surface of the earth to enable a pilot to ascertain the contour of the surface of the ground and the elevation of the aircraft above the ground. This patent focuses on illumination of the ground and of objects in the flight path, with illumination lights at an angle to the pilots normal line of vision. Thus, this patent does not relate to "cueing" lights, in which a pattern of projected light beams changes with changes in contour of the land.

U.S. Pat. No. 2,532,104 to King describes an aircraft lighting system for projecting patterns on the ground. A pair of light projectors are mounted on the wings of the aircraft and an additional projector is mounted at or near the tail. This patent uses existing landing lights and augments them with black lights to provide simulated horizons. Also, beams intersecting at a known distance are used to indicate distance to the ground when the intersection point meets the ground.

U.S. Pat. No. 2,017,692 to Gaty describes a landing light system in which a plurality of lights are mounted at a fixed angle. A different pattern of lights appear based on the altitude of the aircraft as it makes its approach to landing. The different patterns appear due to the arrangement of lights such that at least some of the beams intersect.

The above-noted U.S. patents all involve features of landing lights, which rely on object illumination generally. These systems would not be suitable for military operations where it is necessary to fly visually undetected. Thus, a need exists to augment night vision devices in order to conduct safe and efficient flight in informationally impoverished environments, as where the pilot is unfamiliar with the terrain, but required to fly at low levels under poor lighting.

SUMMARY OF THE INVENTION

An object of the present invention is to provide a cueing light system capable of augmenting low-light navigation aides for low flying aircraft.

Another object of the present invention is to provide a cueing light system for aiding navigation of an aircraft flying in featureless terrain, such as deserts and over large bodies of water.

Another object of the present invention is to provide a cueing light system which is capable of providing the pilot with sufficient reaction time to permit corrective or evasive maneuvers when objects and terrain enter the flight path.

Still another object of the present invention is to provide a cueing light system which projects a pattern of cueing lights which suggest by their pattern what corrective actions should be undertaken by the pilot.

These and other objects of the invention are met by providing a cueing light system for aiding navigation of an aircraft, which includes a first group of light sources projecting a leading cluster of lights onto the ground, each emitting a beam from a point of origin, the first group of light sources including at least one upper light source and at least one lower light source, the point of origin of the beam for the at least one upper light source being vertically spaced from the point of origin of the beam for the at least one lower light source, and a second group of light sources projecting a trailing cluster of lights onto the ground, each emitting a beam from a point of origin, the second group of light sources including at least one upper light source and at least one lower light source, the point of origin of the beam for at least one upper light source being vertically spaced from the point of origin of the beam for the at least one lower light source, the beams of the leading and trailing clusters of lights impinging upon the ground in a predetermined pattern at a nominal altitude and a level terrain, the predetermined pattern of at least one of the first and second clusters of lights varying in accordance with variations in at least one of altitude and terrain contour.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

FIG. 3 is a chart showing the relationship between light patterns and flight conditions;

FIG. 4 is a front view of an aircraft having the cueing lights mounted on a mast;

FIG. 5 is a front view similar to FIG. 4, but with the cueing lights mounted on the sides and above the rotor;

FIG. 6 is an enlarged, side elevational view of the mast and cueing light assembly according to the embodiment of FIG. 4; and FIG. 7 is a front view of the mast and cueing light assembly of FIG. 6.

DETAILED DESCRIPTION OF THE INVENTION

Figure 1:
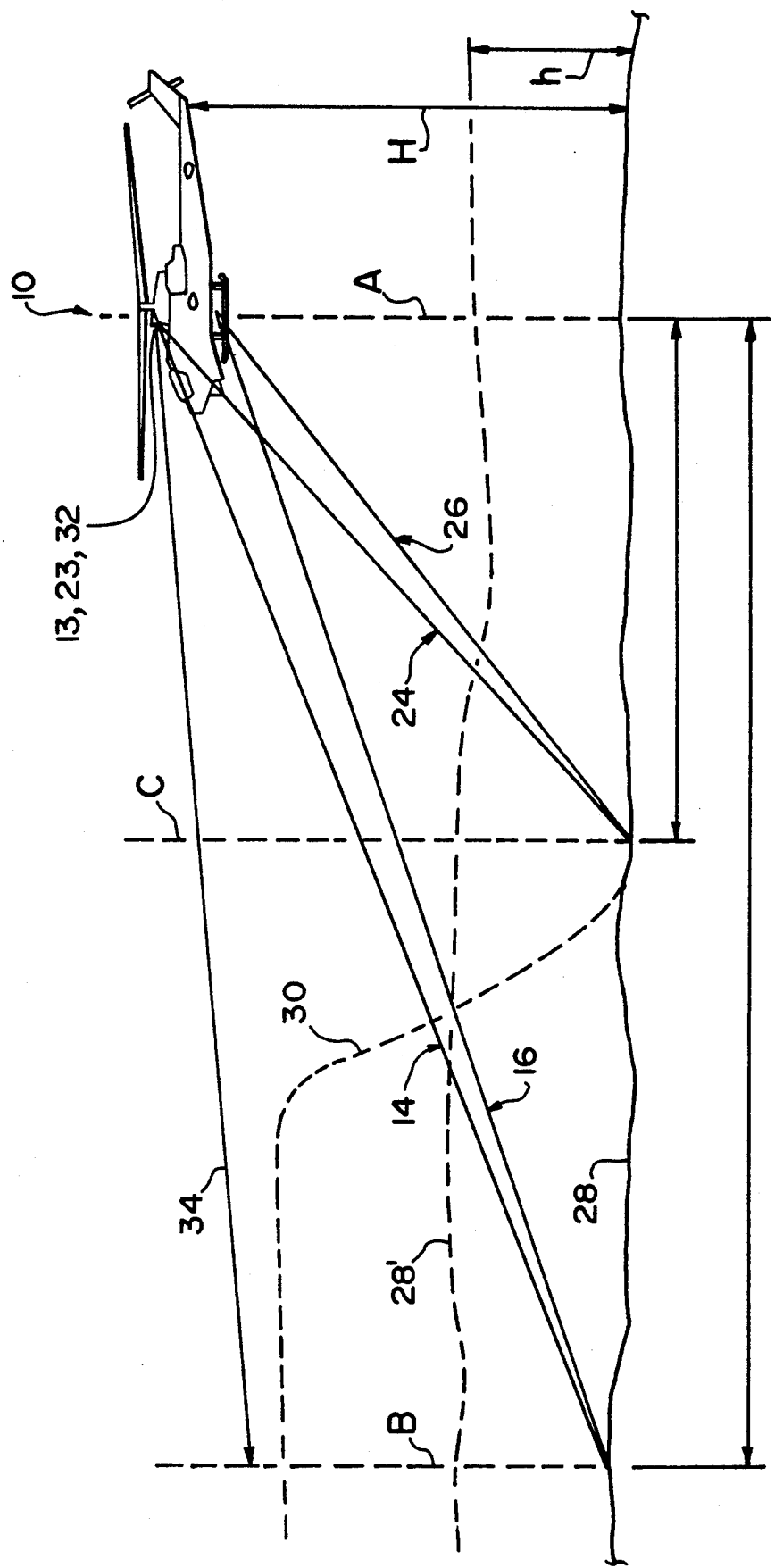
FIG. 1 is a schematic side elevational view of a cueing light system according to a preferred embodiment of the present invention.
Figure 2:
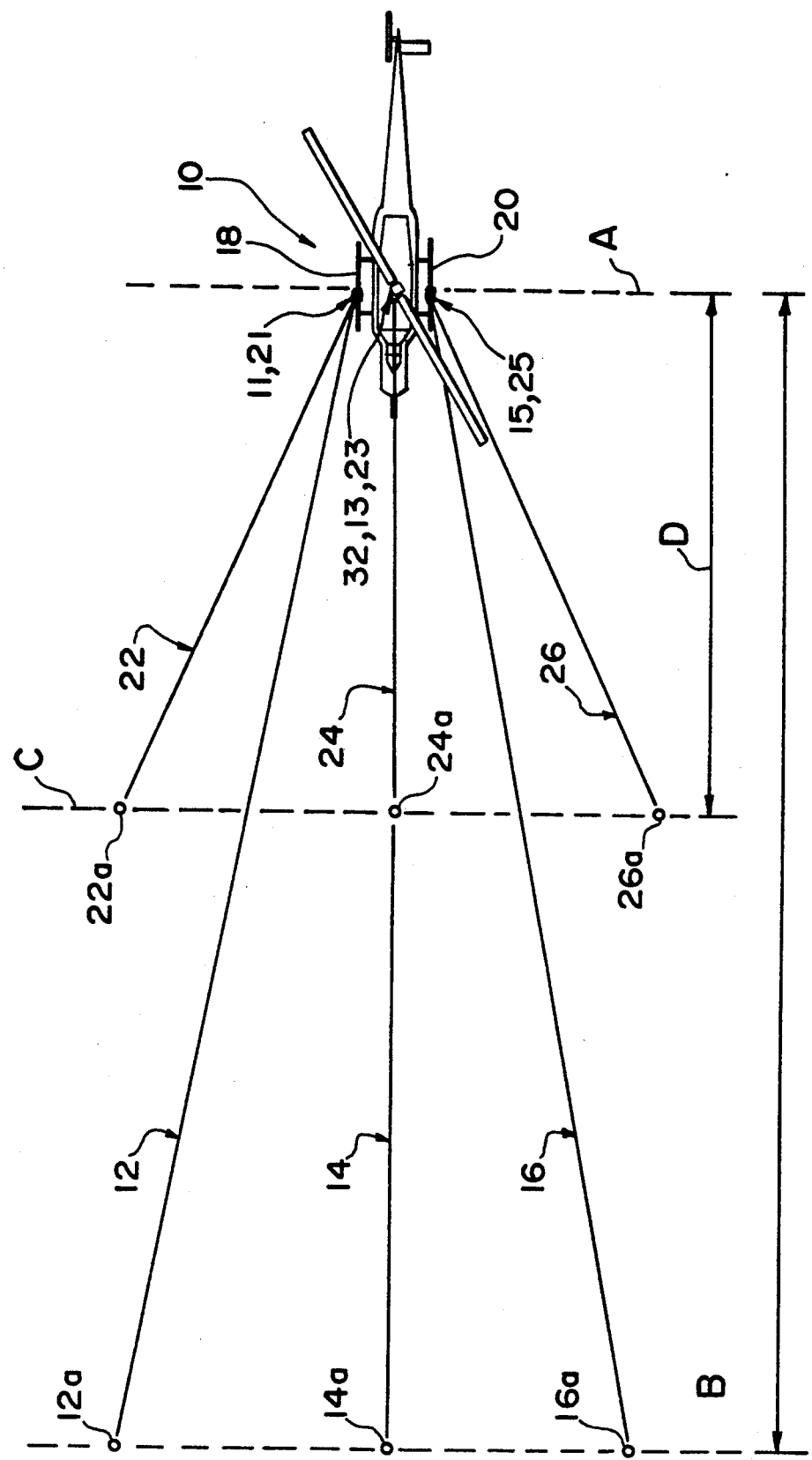
FIG. 2 is a schematic top view of the cueing light system of FIG. 1.

Referring initially to FIGS. 1 and 2, a helicopter 10 equipped with the cueing light system of the present invention projects a leading cluster of light beams 12, 14, and 16. The middle light beam 14 emanates from a light source 13 mounted on the helicopter 10 vertically above the pilot's vantage point or point of vision. The side beams 12 and 16 emanate from light sources 11 and 15, respectively, mounted on the helicopter 10 vertically below the pilot's point of vision. In the embodiment of FIGS. 1 and 2, the light source 13 is mounted to one side of the longitudinal, vertical plane of symmetry of the helicopter so that the beam 14 is not interfered with by the cockpit or fuselage of the aircraft. Also, the light source is just below the rotor assembly. The light sources 11 and 15 are mounted respectively on skids 18 and 20 of the helicopter 10. The points of origin of each beam 12, 14, and 16, corresponding to the position of each respective light source 11, 13, and 15 all substantially lie in the same vertical plane "A", with the point of origin of the middle beam 14 being vertically spaced from the point of origin of the two side beams 12 and 16.

A trailing cluster of light beams 22, 24, and 26 also emanates from the helicopter 10. The middle light beam 24 emanates from a light source 23 mounted on the helicopter 10 vertically above the pilot's vantage point or point of vision. The side beams 22 and 26 emanate from light sources 21 and 25, respectively, mounted on the helicopter 10 vertically below the pilot's point of vision. In the embodiment of FIGS. 1 and 2, the light source 23 is mounted to one side of the longitudinal, vertical plane of symmetry of the helicopter so that the beam 24 is not interfered with by the cockpit or fuselage of the aircraft. Also, the light source 23 is just below the rotor assembly. The light sources 21 and 25 are mounted respectively on skids 18 and 20 of the helicopter 10. The points of origin of each beam 22, 24, and 26, corresponding to the position of each respective light source 21, 23, and 25 all substantially lie in the same vertical plane "A", with the point of origin of the middle beam 24 being vertically spaced from the point of origin of the two side beams 22 and 26.

The light sources are positioned so that when the helicopter is in level flight and over level terrain, and at a predetermined nominal altitude, the various light beams form predetermined patterns when impinging on the ground. This condition is represented in FIGS. 1 and 2, where the leading cluster of beams 12, 14, and 16 impinge upon the ground 28 to illuminate three light spots 12a, 14a, and 16a, all being in horizontal alignment along line "B". Similarly, the trailing cluster of beams 22, 24, and 26 impinge upon the ground to illuminate three light spots 22a, 24a, and 26a, all being in horizontal alignment along line "C". The six light dots are designed to form two horizontal rows, as seen in FIG. 2, when the aircraft is flying at a predetermined nominal altitude. In the illustrated embodiment, this altitude "H" (FIG. 1) is thirty meters above the ground 28.

The projected pattern of lights is seen in FIG. 3. The arrangement of light sources described with respect to the embodiment of FIGS. 1 and 2 is known as the "double delta" configuration because when the aircraft flies above or below the nominal altitude, the two horizontal rows of cueing lights become two clusters of triangular shape. For example, as seen in FIG. 1, if the helicopter is flying too low, the ground 28' (shown in broken line) is closer to the helicopter by an amount equal to the loss of altitude "h". The new altitude is H−h. It can be seen that the middle light beams 14 and 24 impinge upon the ground 28' after the side beams 16 and 26, thus creating the pattern seen in FIG. 3 in the column "Below Nominal Altitude Level Terrain". The two "delta" clusters of lights appear to be pointing upwardly, thus cueing the pilot to take corrective action to raise the altitude. Similarly, if the helicopter 10 is flying too high, a double delta pattern will appear, as seen in FIG. 3, cueing the pilot to take corrective action to lower the altitude.

If the ground 28 changes contour to include a hill 30, when the leading cluster of lights hits the hill 30 the delta pattern will appear due to the middle light 14 impinging upon the uphill slope above the side lights 12 and 16. Again, the delta pattern of the leading cluster will cue the pilot to take corrective action to raise the altitude of the helicopter 10. The opposite pattern will appear if the helicopter encounters a downslope, so that the leading cluster of lights will cue the pilot to lower the altitude.

Because the double delta pattern is capable of helping the pilot maintain a predetermined nominal altitude, and adopt a flight path which conforms to the contour of the ground, the system can be referred to as a "pseudo flight director". Simple obstacle detection can be added to the cueing light system by providing a detector light source 32 which radiates a light beam 34. The range of all of the light sources, including light source 32, is preferably about 400 meters. Thus, if an object is in the flight path of the helicopter 10, a beam spot will appear when the helicopter 10 is within 400 meters of the object, giving the pilot time to take corrective or evasive actions. This light has about a 1° angle of visual declination.

The three lights of the trailing cluster converge in a row that is about 2 to 3 seconds ahead of the helicopter 10. When the nominal altitude is 30 meters, this corresponds to a distance of about 125 meters, indicated in FIG. 2 by the letter "D", at normal forward flight speed. The trailing cluster has about a 13.5° angle of visual declination. The leading cluster of lights converge in a row that is about 4 to 6 seconds ahead of the helicopter 10. At the nominal altitude of 30 meters, this corresponds to a lead of about 280 meters, and an angle of visual declination of about 6°. Normal air speed is about 50 meters/second. The upper light sources 13 and 23 are about two meters above the lower light sources 15, 25 and 11, 21.

The light sources are all preferably highly focused energy beams. When operating in the visible light spectrum, commercially available laser aiming lights can be used. These can be mounted on the helicopter with any suitable means. They can either be hard-mounted, such that they pitch and yaw with the aircraft, or attached on commercially available inertially-stabilized mounts. In the case of the latter, while being more costly, a more consistent pattern of lights projected onto the ground can be assured. Such inertially stabilized mounts are currently used as camera mounts. If it is desirable to operate in a stealth mode, infrared lights can be used. Of course, in order to see the light patterns, the pilot would have to wear night vision goggles, such as Litton or ITT ANVIS 6 goggles.

The light sources can be either spread-mounted on the vehicle, as shown in the embodiment of FIGS. 1 and 2 (two lights on the left skid, two on the right, and two in the middle above the pilot), or mounted on a vertical line. Referring now to FIGS. 4, 6 and 7, the cueing lights are mounted on a vertical mast 36 which is preferably detachably coupled to the helicopter 38 through a coupler 40. The coupler 40 includes an electrical coupling so as to provide power for the light sources 42, 44, 46, 48, 50, and 52, which form the two clusters of lights seen in FIGS. 1-3. Alternatively, self-contained light power sources can be used. The light sources are illustrated to be hard-mounted on brackets. An obstacle detector light source 54 is mounted on top of the mast 36. The exact angular alignment of the light sources will be defined by the aircraft's flight profile. Light sources 50 and 52 emit the middle beams for the two clusters. Light sources 42 and 44 emit the right side beams for the leading and trailing clusters, while light sources 46 and 48 emit the left side beams. An example of the alignment parameters for a thirty meter nominal altitude flight profile is given below in Table I:

TABLE I

| SINGLE POLE MOUNTED ON THE PILOT'S RIGHT SIDE | | | | |
|---|---|---|---|---|
| Long | Lat | Ver | Azim | Elev |
| 0.0 | 0.25 | 0.6 | 0.70° | −6.00° |
| 0.0 | 0.25 | 0.6 | −0.70° | −6.00° |
| 0.0 | 0.25 | −0.6 | 0.00° | −6.24° |
| 0.0 | 0.25 | 0.6 | 0.70° | −13.24° |
| 0.0 | 0.25 | 0.6 | −0.70° | −13.24° |
| 0.0 | 0.25 | −0.6 | 0.00° | −13.76° |
| 0.0 | 0.25 | −1.0 | 0.00° | −1.00° |

Adjusted for 30 meter nominal altitude
Angular dimensions in degrees
Offset dimensions (relative to pilot's eyes) in meters:
longitudinal: + forward
lateral: + right (pilot's right)
vertical: + down A spread-mounted arrangement of cueing light sources is illustrated in FIG. 5, in which four light sources 56, 58, 60, and 62 are mounted on the skids of the helicopter 64. Three of the light sources 66, 68 and 70 are mounted on a short mast above the rotor. Light source 70 is the obstacle detector light. An example of the alignment parameters for a thirty meter nominal altitude flight profile is given below in Table II:

TABLE II

| SPREAD MOUNTED | | | | |
|---|---|---|---|---|
| Long | Lat | Ver | Azim | Elev |
| 0.0 | −0.5 | 1.0 | 0.00° | −5.91° |
| 0.0 | 0.5 | 1.0 | 0.00° | −5.91° |
| 0.0 | 0.0 | −1.0 | 0.00° | −6.32° |
| 0.0 | −0.5 | 1.0 | 0.00° | −13.90° |
| 0.0 | 0.5 | 1.0 | 0.00° | −13.90° |
| 0.0 | 0.0 | −1.0 | 0.00° | −13.06° |
| 0.0 | 0.0 | −1.0 | 0.00° | −1.00° |

Adjusted for 30 meter nominal altitude
Angular dimensions in degrees
Offset dimensions (relative to pilot's eyes) in meters:
longitudinal: + forward
lateral: + right (pilot's right)
vertical: + down While advantageous embodiments have been chosen to illustrate the invention, it will be understood by those skilled in the art that various changes and modifications can be made therein without departing from the scope of the invention as defined in the appended claims.

We claim:

1. A cueing light navigation system for an aircraft in substantially level flight, comprising:
   a plurality of lower light sources projecting a plurality of light beams downwardly and forwardly from the aircraft at first and second angles relative to the aircraft; and
   a plurality of upper light sources projecting a plurality of light beams downwardly and forwardly from the aircraft at third and fourth angles relative to the aircraft,
   the plurality of light beams from the lower and upper light sources impinging on the ground in first and second clusters of light spots, each cluster having a predetermined pattern when the aircraft is at a nominal, predetermined altitude and flying over substantially featureless terrain,
   each cluster pattern varying in accordance with one of the deviations from the nominal altitude and changes in terrain,
   each of the plurality of lower light sources having a point of origin disposed below an eye point of a pilot of the aircraft, and
   each of the plurality of upper light sources having a point of origin disposed above the eye point of the pilot of the aircraft.

2. A cueing light navigation system according to claim 1, wherein the plurality of lower light sources includes a first light source projecting a center light spot into the first cluster and a second light source projecting a center light spot into the second cluster.

3. A cueing light navigation system according to claim 1, wherein the plurality of upper light sources includes third and fourth light sources respectively projecting left and right-side light spots into the first cluster, and fifth and sixth light sources respectively projecting left and right-side light spots into the second cluster.

4. A cueing light navigation system according to claim 1, wherein the plurality of lower light sources includes a first light source projecting a center light spot into the first cluster and a second light source projecting a center light spot into the second cluster, and wherein the plurality of upper light sources includes third and fourth light sources respectively projecting left and right-side light spots into the first cluster, and fifth and sixth light sources respectively projecting left and right-side light spots into the second cluster.

5. A cueing light navigation system according to claim 1, wherein the predetermined pattern of the first cluster of light spots is a first horizontal row, the predetermined pattern of the second cluster of light spots is a second horizontal row parallel to and spaced behind the first horizontal row, and wherein the first and second horizontal rows change to delta patterns when the aircraft flies above or below the nominal altitude.

6. A cueing light navigation system according to claim 1, wherein the plurality of lower and upper light sources radiate light in the visible light spectrum.

7. A cueing light navigation system according to claim 1, wherein the plurality of lower and upper light sources radiate light in the infrared light spectrum.

8. A cueing light navigation system according to claim 1, further comprising a vertically oriented mast detachably coupled to the aircraft for mounting the lower and upper light sources.

* * * * *